US011785426B2

(12) United States Patent
Nader et al.

(10) Patent No.: US 11,785,426 B2
(45) Date of Patent: Oct. 10, 2023

(54) CONFIGURATION OF A GROUP OF WIRELESS DEVICES

(71) Applicant: Telefonaktiebolaget LM Ericsson (publ), Stockholm (SE)

(72) Inventors: Ali Nader, Malmö (SE); Per Fryking, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 285 days.

(21) Appl. No.: 17/258,837

(22) PCT Filed: Jul. 11, 2018

(86) PCT No.: PCT/EP2018/068771
§ 371 (c)(1),
(2) Date: Jan. 8, 2021

(87) PCT Pub. No.: WO2020/011344
PCT Pub. Date: Jan. 16, 2020

(65) Prior Publication Data
US 2021/0274322 A1 Sep. 2, 2021

(51) Int. Cl.
*H04W 4/08* (2009.01)
*H04W 4/80* (2018.01)
(52) U.S. Cl.
CPC .............. *H04W 4/08* (2013.01); *H04W 4/80* (2018.02)
(58) Field of Classification Search
CPC .................................. H04W 4/08; H04W 4/80
See application file for complete search history.

(56) References Cited

U.S. PATENT DOCUMENTS

| 2013/0242825 | A1 | 9/2013 | Farhadi et al. |
| 2013/0286918 | A1 | 10/2013 | Park et al. |
| 2015/0282208 | A1 | 10/2015 | Yi et al. |
| 2017/0208612 | A1 | 7/2017 | Tushar et al. |
| 2019/0387401 | A1* | 12/2019 | Liao ................... H04W 28/0289 |
| 2020/0021952 | A1* | 1/2020 | Koudouridis ........... H04W 4/08 |
| 2020/0092685 | A1* | 3/2020 | Fehrenbach ............ H04W 4/44 |
| 2021/0058748 | A1* | 2/2021 | Liao ...................... H04W 76/11 |

OTHER PUBLICATIONS

International Search Report and Written Opinion of the International Searching Authority, PCT/EP2018/068771, dated Mar. 18, 2019, 12 pages.

* cited by examiner

*Primary Examiner* — David Bilodeau
(74) *Attorney, Agent, or Firm* — SAGE PATENT GROUP

(57) ABSTRACT

Mechanisms are provided for configuring a group of wireless devices capable of communicating with each other over a short-range connection and configured to communicate with a network node over a long-range wireless connection at respective predefined occasions. A method is performed by the network node. The method includes obtaining information that the wireless devices are candidates for being grouped together. The method further includes grouping the wireless devices into the group of wireless devices by distributing the predefined occasions within the group of wireless devices such that all the predefined occasions, for all the wireless devices in the group of wireless devices, do not fully overlap in time. The method further includes transmitting information indicative of the distributed predefined occasions to the wireless devices in the group of wireless devices, thereby configuring the group of wireless devices.

22 Claims, 7 Drawing Sheets

CONFIGURATION OF A GROUP OF WIRELESS DEVICES

CROSS REFERENCE TO RELATED APPLICATIONS

This application is a 35 U.S.C. § 371 national stage application of PCT International Application No. PCT/EP2018/068771 filed on Jul. 11, 2018, the disclosure and content of which is incorporated by reference herein in its entirety.

TECHNICAL FIELD

Embodiments presented herein relate to a method, a network node, a computer program, and a computer program product for configuring a group of wireless devices. Embodiments presented herein further relate to a method, a wireless device, a computer program, and a computer program product for the wireless device to be grouped into the group of wireless devices.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the capability for devices to connect and exchange data.

In general terms, the so-called Internet of Things (IoT) is a network of physical devices such as vehicles, home appliances, and other entities embedded with electronics, software, sensors, actuators, and connectivity which enables these physical devices to connect and exchange data.

IoT communication might comprise paging, signalling, exchange of data, measurement data, configuration information etc. To save power and network resources in a long-range network with IoT capable devices hosted by battery operated User Equipment (UE) having limited battery capacity, long Discontinuous Reception (DRX) cycles can be utilized.

With so-called enhanced DRX (eDRX) for example, a UE may be in a sleep mode up to about 3 hours in between paging occasions in which the network node may be able to page the UE. With the use of so-called power save mode (PSM), a UE might sleep up to about 1 year in between the occasions in which the network node is able to page the UE. This could enable the battery life of the UE to be extended to 10 years or more.

Since the UE will then check for paging rather seldom, the latency to page a UE is considerable. To transmit data to the network node in the network also requires power and network resources and is therefore made as seldom as possible. The resolution in time of the data collected from the UEs is therefore low.

Hence, there is still a need for enabling improved communication with wireless devices with long sleep times.

SUMMARY

An object of embodiments herein is to provide mechanisms that enable efficient communication with wireless devices with long sleep times that do not suffer from the issues noted above, or at least where these issues are reduced or mitigated.

According to a first aspect there is presented a method for configuring a group of wireless devices capable of communicating with each other over a short-range connection and configured to communicate with a network node over a long-range wireless connection at respective predefined occasions. The method is performed by the network node. The method comprises obtaining information that the wireless devices are candidates for being grouped together. The method comprises grouping the wireless devices into the group of wireless devices by distributing the predefined occasions within the group of wireless devices such that all the predefined occasions, for all the wireless devices in the group of wireless devices, do not fully overlap in time. The method comprises transmitting information indicative of the distributed predefined occasions to the wireless devices in the group of wireless devices, thereby configuring the group of wireless devices.

According to a second aspect there is presented a network node for configuring a group of wireless devices capable of communicating with each other over a short-range connection and configured to communicate with a network node over a long-range wireless connection at respective predefined occasions. The network node comprises processing circuitry. The processing circuitry is configured to cause the network node to obtain information that the wireless devices are candidates for being grouped together. The processing circuitry is configured to cause the network node to group the wireless devices into the group of wireless devices by distributing the predefined occasions within the group of wireless devices such that all the predefined occasions, for all the wireless devices in the group of wireless devices, do not fully overlap in time. The processing circuitry is configured to cause the network node to transmit information indicative of the distributed predefined occasions to the wireless devices in the group of wireless devices, thereby configuring the group of wireless devices.

According to a third aspect there is presented a network node for configuring a group of wireless devices capable of communicating with each other over a short-range connection and configured to communicate with a network node over a long-range wireless connection at respective predefined occasions. The network node comprises an obtain module configured to obtain information that the wireless devices are candidates for being grouped together. The network node comprises a group module configured to group the wireless devices into the group of wireless devices by distributing the predefined occasions within the group of wireless devices such that all the predefined occasions, for all the wireless devices in the group of wireless devices, do not fully overlap in time. The network node comprises a transmit module configured to transmit information indicative of the distributed predefined occasions to the wireless devices in the group of wireless devices, thereby configuring the group of wireless devices.

According to a fourth aspect there is presented a computer program for configuring a group of wireless devices, the computer program comprising computer program code which, when run on processing circuitry of a network node, causes the network node to perform a method according to the first aspect.

According to a fifth aspect there is presented a method for a wireless device (300a) to be grouped into a group of wireless devices capable of communicating with each other over a short-range connection and configured to communicate with a network node over a long-range wireless connection at respective predefined occasions. The method is performed one wireless device in the group of wireless devices to be formed. The method comprises receiving information. The information originates from the network node and is indicative of the predefined occasions as distributed within the group of wireless devices. The predefined occasions are distributed such that all the predefined occasions, for all the wireless devices in the group of wireless devices, do not fully overlap in time. The information indicates that the wireless device is part of the group of wireless devices.

According to a sixth aspect there is presented a wireless device for being grouped into a group of wireless devices capable of communicating with each other over a short-range connection and configured to communicate with a network node over a long-range wireless connection at respective predefined occasions. The wireless device comprises processing circuitry. The processing circuitry is configured to cause the wireless device to receive information. The information originates from the network node and is indicative of the predefined occasions as distributed within the group of wireless devices. The predefined occasions are distributed such that all the predefined occasions, for all the wireless devices in the group of wireless devices, do not fully overlap in time. The information indicates that the wireless device is part of the group of wireless devices.

According to a seventh aspect there is presented a wireless device for being grouped into a group of wireless devices capable of communicating with each other over a short-range connection and configured to communicate with a network node over a long-range wireless connection at respective predefined occasions. The wireless device comprises a receive module configured to receive information. The information originates from the network node and is indicative of the predefined occasions as distributed within the group of wireless devices. The predefined occasions are distributed such that all the predefined occasions, for all the wireless devices in the group of wireless devices, do not fully overlap in time. The information indicates that the wireless device is part of the group of wireless devices.

According to an eight aspect there is presented a computer program for a wireless device to be grouped into a group of wireless devices, the computer program comprising computer program code which, when run on processing circuitry of a wireless device, causes the wireless device to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these network nodes, these wireless devices, and these computer programs enables efficient communication with wireless devices with long sleep times without suffering from the issues noted above.

Advantageously these methods, these network nodes, these wireless devices, and these computer programs enables efficient communication with wireless devices with rather short delay without compromising too much on the power consumption of the wireless devices.

It is to be noted that any feature of the first, second, third, fourth, fifth, sixth seventh, eight, and ninth aspects may be applied to any other aspect, wherever appropriate. Likewise, any advantage of the first aspect may equally apply to the second, third, fourth, fifth, sixth, seventh, eight, and/or ninth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
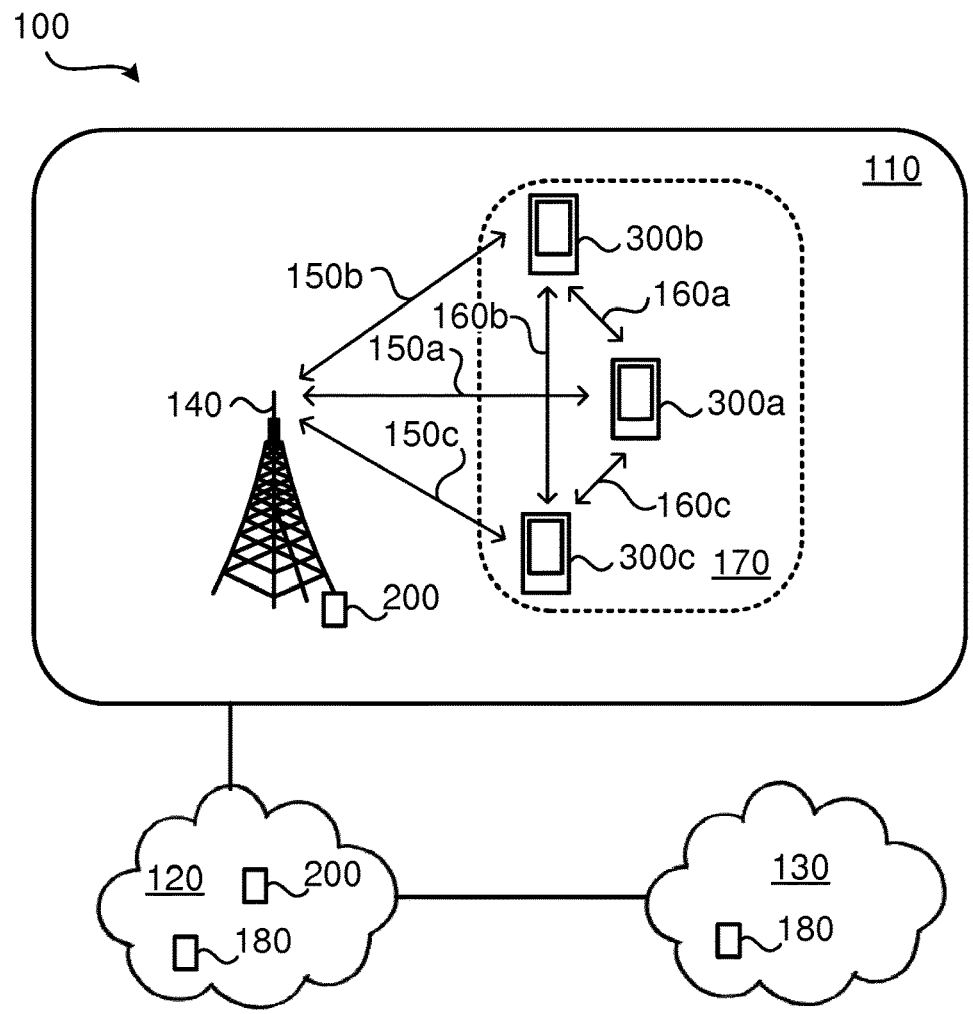
FIGS. 1 and 4 are schematic diagrams illustrating communication networks according to embodiments.

FIG. 1 is a schematic diagram illustrating a communication network 100 where embodiments presented herein can be applied. The communication network 100 could be a third generation (3G) telecommunications network, a fourth generation (4G) telecommunications network, or a fifth (5G) telecommunications network and support any 3GPP telecommunications standard, where applicable.

The communication network 100 comprises a network node 200 configured to, via a radio access network node 140, provide network access to wireless devices 300*a*, 300*b*, 300*c* in a radio access network 110. The radio access network 110 is operatively connected to a core network 120. The core network 120 is in turn operatively connected to a service network 130, such as the Internet. The wireless devices 300a, 300b, 300c are thereby enabled to access services of, and exchange data with, the service network 130. The communication network 100 might further comprise a network controller 180. Non-limiting examples of network controllers 180 are Mobility Management Entities (MME) and Serving GPRS (General Packet Radio Service) Support Nodes (SGSN).

Examples of network nodes 200 are radio access network nodes, radio base stations, base transceiver stations, Node Bs, evolved Node Bs, g Node Bs, access points, and access nodes, and backhaul nodes. Examples of wireless devices 300a, 300b, 300c are mobile stations, mobile phones, handsets, wireless local loop phones, user equipment (UE), smartphones, laptop computers, tablet computers, network equipped sensors, network equipped vehicles, and so-called IoT devices. In this respect, the functionality of network equipped sensors, network equipped vehicles, and so-called IoT devices could be hosted by the wireless devices 300a, 300b, 300c.

The wireless devices 300a, 300b, 300c form a group of wireless devices. In some aspects the group of wireless devices 300a, 300b, 300c defines a mesh network 170. The wireless devices 300a, 300b, 300c in the group of wireless devices 300a, 300b, 300c are capable of communicating with each other over a short-range connection 160a, 160b, 160c. There could be different types of short-range connections 160a, 160b, 160c. The short-range connection 160a, 160b, 160c is wireless or wired. Examples of short-range connections 160a, 160b, 160c include but are not limited to Bluetooth (BLE) and Zigbee.

The wireless devices 300a, 300b, 300c in the group of wireless devices 300a, 300b, 300c are further capable of communicating with the network node 200 over a long-range wireless connection 150a, 150b, 150c. There could be different types of long-range wireless connection 150a, 150b, 150c. Examples of long-range wireless connections 150a, 150b, 150c include but are not limited to wireless connections established over a 3G air interface, a 4G air interface, or a 5G air interface, optionally using additional technologies such as Cat-M, NB-IoT, SigFox and Lora.

The wireless devices 300a, 300b, 300c in the group of wireless devices 300a, 300b, 300c are further capable of communicating with the network node 200 over a long-range wireless connection 150a, 150b, 150c at respective predefined occasions. In general terms, the predefined occasions specify how often each wireless device 300a, 300b, 300c is to exit the sleep mode for being reachable and for how long each wireless device 300a, 300b, 300c is to stay awake during each reachable occasion (i.e., when and how long Active Time each wireless device 300a, 300b, 300c is configured with). The tracking area update (TAU) timer T3412 can be used for this purpose in case the wireless device 300a, 300b, 300c needs to report its presence via a tracking area update procedure, including both transmission and reception activity of the wireless device 300a, 300b, 300c.

Each wireless device 300a, 300b, 300c is thus configured with predefined occasions for waking up from the sleep mode. In general terms, if the predefined occasions are individually adopted for each wireless device 300a, 300b, 300c, this might cause an individual wireless device 300a to have sleep time (i.e. to be in sleep mode) for 1 year or more. As disclosed above there is therefore a need for an improved communication with wireless devices with long sleep times.

As an example, assume that the predefined occasions are individually adopted for one wireless device 300a. Assume further that the battery power of this wireless device 300a is enough for $N_{lifeSpan}$ (say, 3650) TAU-related activities. Excluding any other activities in this example, the life expectancy for this wireless device 300a would be about 10 years if it is reachable only once per day.

Assume further that there exist $N_{Devices}$ (say, 100) of these wireless device 300a, 300b, 300c in the group of wireless devices 300a, 300b, 300c, and that it is desirable by an operator to, within, say 6 minutes, be able to check the status of any wireless device 300a, 300b, 300c in the group of wireless devices 300a, 300b, 300c, and that it is possible to invoke the functionality of the IoT device hosted by any of these wireless devices 300a, 300b, 300c in the group of wireless devices 300a, 300b, 300c based on certain triggers. To be able to conform to these requirements, each individual wireless device 300a, 300b, 300c would have a life expectancy of about 2 weeks (i.e. each wireless device 300a, 300b, 300c is reachable 240 times per day).

If on the other hand these wireless devices 300a, 300b, 300c would operate in a collaborative and coordinated manner, these wireless devices 300a, 300b, 300c could take turn in waking up to check, over the long-range wireless connection 150a, 150b, 150c, whether there is a message for any wireless device 300a, 300b, 300c in the group of wireless devices 300a, 300b, 300c from the network node 200. This would result in about $N_{Devices}$ longer life expectancy per wireless device 300a, 300b, 300c whilst still fulfilling the reachability requirements. It is noted that for the sake of this illustrative example, the power consumption for communication between the wireless devices 300a, 300b, 300c over the short-range connections 160a, 160b, 160c is disregarded here. However, communication over the short-range connections 160a, 160b, 160c is assumed to consume less, or even substantially less, such as one order of magnitude or more, battery power than communication over the long-range wireless connections 150a, 150b, 150c.

A similar example is where the wireless devices 300a, 300b, 300c make use of eDRX, but where the reachability cycles thus are considerably shorter than if PSM is used. For eDRX one paging cycles could have a duration of one minute or less, such as about 10 seconds.

The embodiments disclosed herein thus relate to mechanisms for configuring a group of wireless devices 300a, 300b, 300c and for the wireless device 300a to be grouped into the group of wireless devices 300a, 200b, 200c. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a wireless device 300a, a method performed by the wireless device 300a, and a computer program product comprising code, for example in the form of a computer program, that when run on processing circuitry of the wireless device 300a, causes the wireless device 300a to perform the method.

Figure 2:
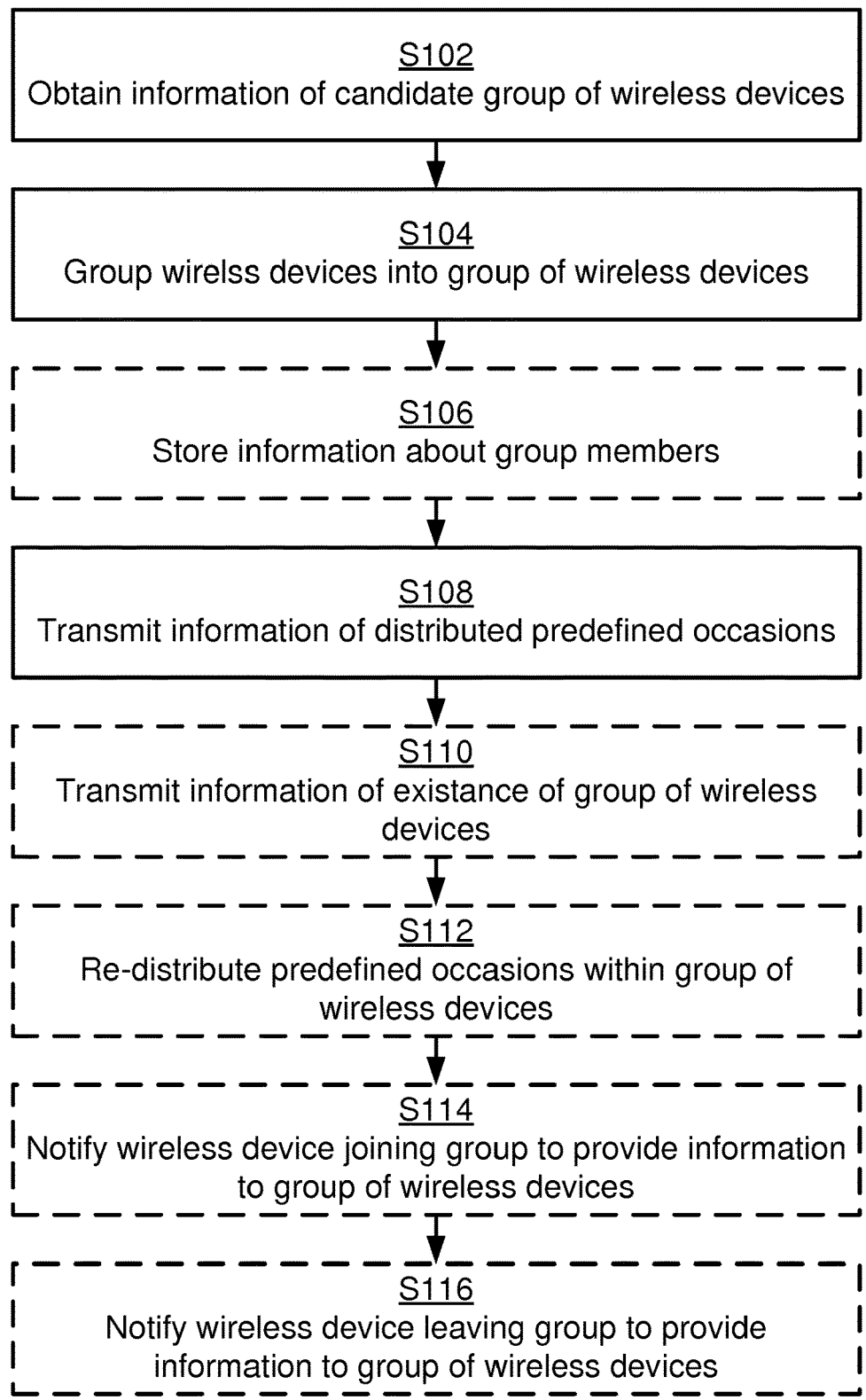
FIGS. 2 and 3 are flowcharts of methods according to embodiments.

Reference is now made to FIG. 2 illustrating a method for configuring a group of wireless devices 300a, 300b, 300c as performed by the network node 200 according to an embodiment.

It is assumed that some wireless devices 300a, 300b, 300c are candidates for being grouped together. Hence the network node 200 is configured to perform step S102:

S102: The network node 200 obtains information that the wireless devices 300a, 300b, 300c are candidates for being grouped together.

The network node 200 then groups the wireless devices 300a, 300b, 300c. Particularly, the network node 200 is configured to perform step S104:

S104: The network node 200 groups the wireless devices 300a, 300b, 300c into the group of wireless devices 300a, 300b, 300c. The wireless devices 300a, 300b, 300c are by the network node 300 grouped by the predefined occasions being distributed within the group of wireless devices 300a, 300b, 300c. The predefined occasions are distributed such that all the predefined to occasions, for all the wireless devices 300a, 300b, 300c in the group of wireless devices 300a, 300b, 300c, do not fully overlap in time.

In other words, there is, at any occasion, one of the wireless devices 300a, 300b, 300c that is configured to communicate with a network node 200 within much shorter notice, such as a fraction of the sleep time, than would otherwise be given by the individual predefined occasions for a single one of the wireless devices 300a, 300b, 300c.

The wireless devices 300a, 300b, 300c are then made aware of the grouping. Thus the network node 200 is configured to perform step S108:

S108: The network node 200 transmits information indicative of the distributed predefined occasions to the wireless devices 300a, 300b, 300c in the group of wireless devices 300a, 300b, 300c. The network node 200 thereby configures the group of wireless devices 300a, 300b, 300c.

Thus, instead of one wireless device 300a, 300b, 300c in the group of wireless devices 300a, 300b, 300c being a permanent proxy and thus being responsible for all communication between members of the group and the network node 200, this enables the wireless devices 300a, 300b, 300c in the group of wireless devices 300a, 300b, 300c to take turn as proxies, thus reducing the overall power consumption for all the wireless devices 300a, 300b, 300c whilst still extending the overall reachability of all the wireless devices 300a, 300b, 300c.

Embodiments relating to further details of configuring a group of wireless devices 300a, 300b, 300c as performed by the network node 200 will now be disclosed.

In some aspects none of the predefined occasions, for all the wireless devices 300a, 300b, 300c in the group of wireless devices 300a, 300b, 300c, overlap in time. This yields the maximum amount of time that the wireless devices 300a, 300b, 300c collectively are reachable.

There could be different ways for the network node 200 to obtain the information in step S102.

In some aspects the information is received from the wireless devices 300a, 300b, 300c themselves. That is, according to an embodiment the information that the wireless devices 300a, 300b, 300c are candidates for being grouped together is obtained from at least one of the wireless devices 300a, 300b, 300c in the group of wireless devices 300a, 300b, 300c. This information might be obtained in the form of mesh proximity measurement reports. Further, the information might comprise a proposal for the wireless devices 300a, 300b, 300c to be grouped.

In some aspects the information is received from the network controller 180. That is, according to an embodiment the information that the wireless devices 300a, 300b, 300c are candidates for being grouped together is obtained from the network controller 180.

There may be different ways to define the predefined occasions.

According to an embodiment the predefined occasions are defined by a PSM configuration collectively determined for the group of wireless devices 300a, 300b, 300c by the network node 200. According to another embodiment the predefined occasions are defined by a DRX cycle configuration collectively determined for the group of wireless devices 300a, 300b, 300c by the network node 200.

In further aspects the predefined occasions are determined according to characteristics of the wireless devices 300a, 300b, 300c in the group of wireless devices 300a, 300b, 300c. That is, according to an embodiment the predefined occasions are determined according to characteristics of the individual wireless devices 300a, 300b, 300c in the group of wireless devices 300a, 300b, 300c. There could be different examples of characteristics. According to some non-limiting examples, the characteristics pertain to: remaining battery power, total battery capacity, and coverage using the short-range connection 160a, 160b, 160c, and/or the long-range wireless connection 150a, 150b, 150c.

Thereby, a wireless device with a comparably high level of remaining battery power might have more, or longer, predefined occasions than another wireless device with a comparably low level of remaining battery power. That is, the wireless device with a comparably high level of remaining battery power might, according to the predefined occasions, be configured to wake up more often and/or longer per reachability cycle than the wireless device with a comparably low level of remaining battery power. Similarly, a wireless device with a comparably high total battery capacity might have more, or longer, predefined occasions than another wireless device with a comparably low total battery capacity. Similarly, a wireless device with a comparably high coverage might have more, or longer, predefined occasions than another wireless device with a comparably low coverage. Using the characteristics could thus result in a weighted mesh configuration.

In other aspects the predefined distributed uniformly in time among the wireless devices 300a, 300b, 300c, for example within a DRX cycle or within one sleep cycle of a PSM configuration.

There could be different ways for the network node 200 to determine which of the wireless devices 300a, 300b, 300c that are to be grouped together.

According to an embodiment, which of the wireless devices 300a, 300b, 300c to be grouped into the group of wireless devices 300a, 300b, 300c is based on which type of wireless device 300a, 300b, 300c each individual wireless device 300a, 300b, 300c is. Thereby, all IoT devices of a certain type, such as smoke detectors, temperature sensors, motion sensors, fire alarms, sprinklers, radiators, etc. could be grouped together. According to an embodiment, which which of the wireless devices 300a, 300b, 300c to be grouped into the group of wireless devices 300a, 300b, 300c is based on geographical location for each individual wireless device 300a, 300b, 300c. Thereby, all IoT devices in the same room, building floor, or building, could be grouped together.

In some aspects the network node 200 stores information about which wireless devices 300a, 300b, 300c belong to which group. Hence, according to an embodiment the network node 200 is configured to perform (optional) step S106:

S106: The network node 200 stores information about which wireless devices 300a, 300b, 300c are part of the group of wireless devices 300a, 300b, 300c.

The network node 200 thereby can keep track of mesh networks. In some examples the information in step S106 is stored in a Home Subscription Server (HSS) of the core network 120.

In some aspects the configuration is provided to one of the wireless devices 300a, 300b, 300c in the group of wireless devices 300a, 300b, 300c for further distribution to the remaining wireless devices in the group. That is, according to an embodiment the information indicative of the configured predefined occasions is transmitted to a single one of the wireless devices 300a, 300b, 300c in the group of wireless devices 300a, 300b, 300c over the long-range wireless connection 150a, 150b, 150c and in one of the predefined occasions for that single one of the wireless devices 300a, 300b, 300c.

Once the group of wireless devices 300a, 300b, 300c has been formed, the network node could advertise information about the group for potential other wireless devices to join the group. Hence, according to an embodiment the network node 200 is configured to perform (optional) step S110:

S110: The network node 200 transmits information indicating existence of the group of wireless devices 300a, 300b, 300c.

Hence, the network node 200 could thereby advertise existing mesh networks 170 for potential new wireless devices to join. The information in step S110 could for example be transmitted as broadcast in a system information message and/or be transmitted in a radio resource control (RRC) configuration message, e.g. an RRCReconfiguration-Request message.

It could be that the predefined occasions need to be re-distributed upon a wireless device joining or leaving the group of wireless devices 300a, 300b, 300c. Therefore, according to an embodiment the network node 200 is configured to perform (optional) step S112:

S112: The network node 200 re-distributes the predefined occasions within the group of wireless devices 300a, 300b, 300c upon another wireless device 300d being confirmed to join 1010 the group of wireless devices 300a, 300b, 300c, and/or upon one wireless device 300b in the group of wireless devices 300a, 300b, 300c being confirmed to leave the group of wireless devices 300a, 300b, 300c.

Information of the thus re-distributed predefined occasions could then be stored the same way as in step S106.

In some aspects, when a new wireless device 300d joins the group, this wireless device 300d should convey the configuration from the network node 200. Particularly, according to an embodiment the network node 200 is configured to perform (optional) step S114:

S114: The network node 200 notifies the so-called another wireless device 300d to, upon joining the group of wireless devices 300a, 300b, 300c, provide information indicative of the re-distributed predefined occasions to the wireless devices 300a, 300b, 300c in the group of wireless devices 300a, 300b, 300c.

That a wireless device 300d is to join the group of wireless devices 300a, 300b, 300c might be determined from a mesh proximity measurement report received by the network node 200 from the wireless device 300d or from one of the wireless devices 300a, 300b, 300c in the group of wireless devices 300a, 300b, 300c.

In some aspects, when a current wireless device 300c leaves the group, this wireless device 300c should convey the configuration from the network node 200 before leaving the group. Particularly, according to an embodiment the network node 200 is configured to perform (optional) step S116:

S116: The network node 200 notifies the one wireless device 300c leaving the group of wireless devices 300a, 300b, 300c to, before leaving the group of wireless devices 300a, 300b, 300c, provide information indicative of the re-distributed predefined occasions to the wireless devices 300a, 300b, 300c in the group of wireless devices 300a, 300b, 300c.

There could be different ways to determine which wireless devices are allowed to leave and join the group, and thus control the mobility to and from the group. In some aspects this is controlled by the network node 200. Hence, according to an embodiment, which another wireless device 300d is allowed to join 1010 the group of wireless devices 300a, 300b, 300c, and/or which wireless device 300b in the group of wireless devices 300a, 300b, 300c is allowed to leave 1020 the group of wireless devices 300a, 300b, 300c is controlled by the network node 200.

Figure 3:
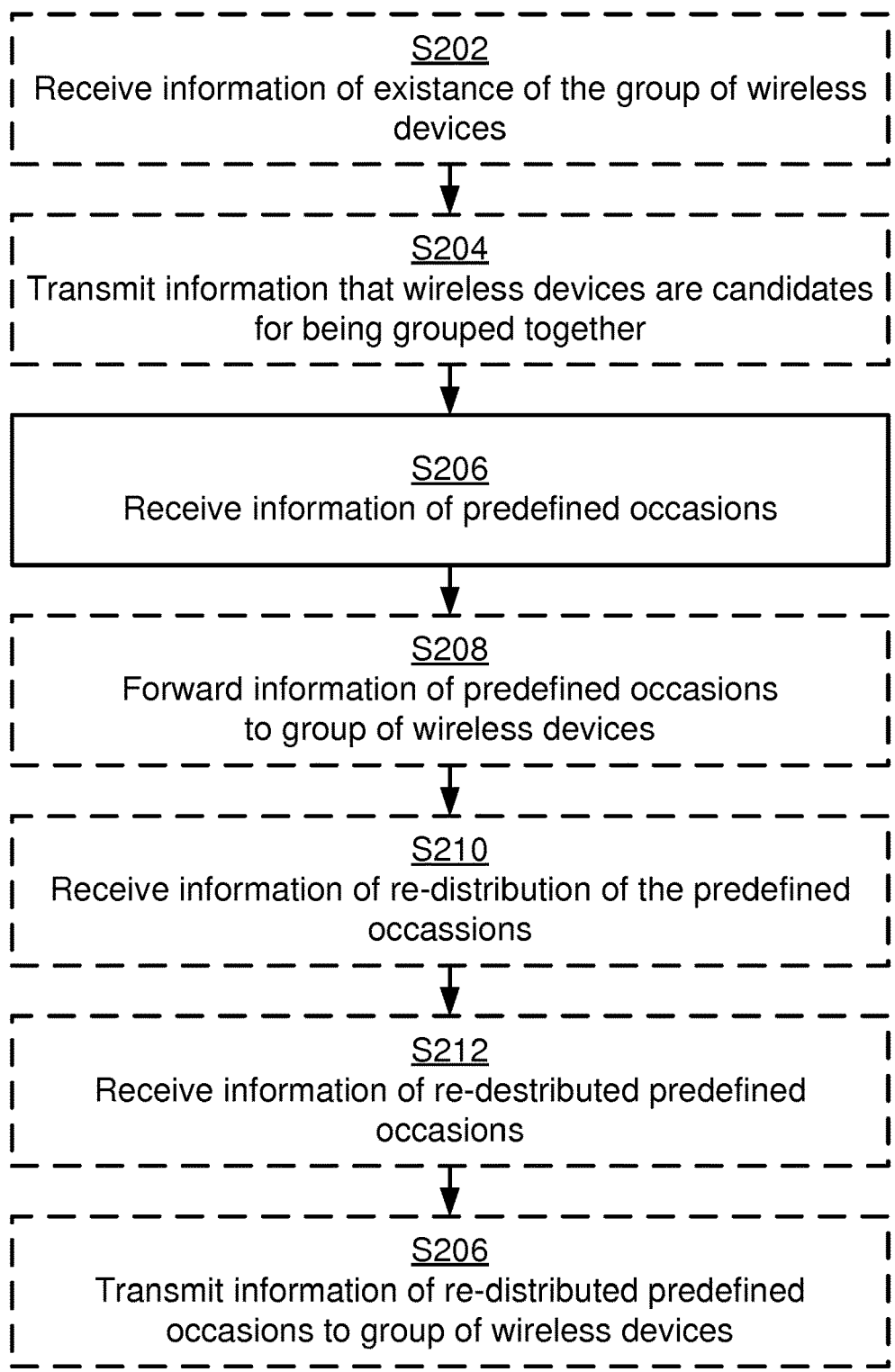

Reference is now made to FIG. 3 illustrating a method for the wireless device 300a to be grouped into the group of wireless devices 300a, 200b, 200c as performed by one wireless device 300a in the group of wireless devices 300a, 200b, 200c according to an embodiment.

The wireless device 300a is configured to perform step S206 in order to receive information that the wireless device 300a is part of the group of wireless devices 300a, 300b, 300c. Thus, the wireless device 300a is configured to perform step S206:

S206: The wireless device 300a receives information. The information originates from the network node 200. The information is indicative of the predefined occasions as distributed within the group of wireless devices 300a, 300b, 300c. The predefined occasions are distributed such that all the predefined occasions, for all the wireless devices 300a, 300b, 300c in the group of wireless devices 300a, 300b, 300c, do not fully overlap in time. The information indicates that the wireless device 300a is part of the group of wireless devices 300a, 300b, 300c.

Embodiments relating to further details of the wireless device 300a being grouped into the group of wireless devices 300a, 200b, 200c as performed by the wireless device 300a will now be disclosed.

As disclosed above, according to an embodiment none of the predefined occasions, for all the wireless devices 300a, 300b, 300c in the group of wireless devices 300a, 300b, 300c, overlap in time.

There could be different ways for the wireless devices 200a to receive the information in step S206. In some aspects the information is received from the network node 200 itself. The information is then received over the long-range wireless connection 150a.

The wireless device 300a could then forward the information to the remaining members of the group. Particularly, according to an embodiment the wireless device 300a is configured to perform (optional) step S208:

S208: The wireless device 300a forwards the information to at least one other wireless device 200b, 200c in the group of wireless devices 300a, 200b, 200c. The information is then forwarded over the short-range connection 160a, 160b.

In other aspects the information is received from another wireless device 200b, 200c in the group of wireless devices 300a, 200b, 200c. The information is the received over the short-range connection 160a, 160b.

As disclosed above, the network node 200 in some aspects advertises information about existing group(s) of wireless devices. Hence, the wireless device 300a might receive such advertise information about existing groups before joining the group. Particularly, according to an embodiment the wireless device 300a is configured to perform (optional) step S202:

S202: The wireless device 300a receives, before being part of the group of wireless devices 300a, 300b, 300c, information indicating existence of the group of wireless devices 300a, 300b, 300c.

Step S202 is thus performed before step S206.

As disclosed above, the network node 200 in some aspects obtains information that the wireless devices 300a, 300b, 300c are candidates for being grouped together from the wireless devices 300a, 300b, 300c themselves. Hence, according to an embodiment the wireless device 300a is configured to perform (optional) step S204:

S204: The wireless device 300a transmits, before being part of the group of wireless devices 300a, 300b, 300c, information that the wireless devices 300a, 300b, 300c are candidates for being grouped together towards the network node 200.

Step S204 is thus performed before step S206. The information transmitted in step S204 might be a mesh proximity measurement report.

As disclosed above, the network node 200 in some aspects notifies a wireless device joining or leaving the group to provide information about re-distribution of the predefined occasions to the other members of the group. Hence, according to an embodiment the wireless device 300a is configured to perform (optional) step S210:

S210: The wireless device 300a receives, when being part of the group of wireless devices 300a, 300b, 300c, information of re-distribution of the predefined occasions within the group of wireless devices 300a, 300b, 300c upon another wireless device 300d joining the group of wireless devices 300a, 300b, 300c, and/or upon one wireless device 300b in the group of wireless devices 300a, 300b, 300c leaving the group of wireless devices 300a, 300b, 300c.

The information of re-distribution might be received from the so-called another wireless device 300d upon the so-called another wireless device 300d joining the group of wireless devices 300a, 300b, 300c, and/or is received from the one wireless device 300b upon the one wireless device 300b leaving the group of wireless devices 300a, 300b, 300c.

Also in this respect the wireless device 300a might receive such information from the network node 200 when the wireless device 300a is about to leave the group. Hence, according to an embodiment the wireless device 300a is configured to perform (optional) step S212:

S212: The wireless device 300a receives, when confirmed to leave the group of wireless devices 300a, 300b, 300c, information indicative of the distributed predefined occasions having been re-distributed within the group of wireless devices 300a, 300b, 300c.

The wireless device 300a could then forward this information to the other members of the group. Hence, according to an embodiment the wireless device 300a is configured to perform (optional) step S214:

S214: The wireless device 300a transmits information indicative of the re-distributed predefined occasions to the wireless devices 300a, 300b, 300c in the group of wireless devices 300a, 300b, 300c before leaving the group of wireless devices 300a, 300b, 300c.

Figure 4:
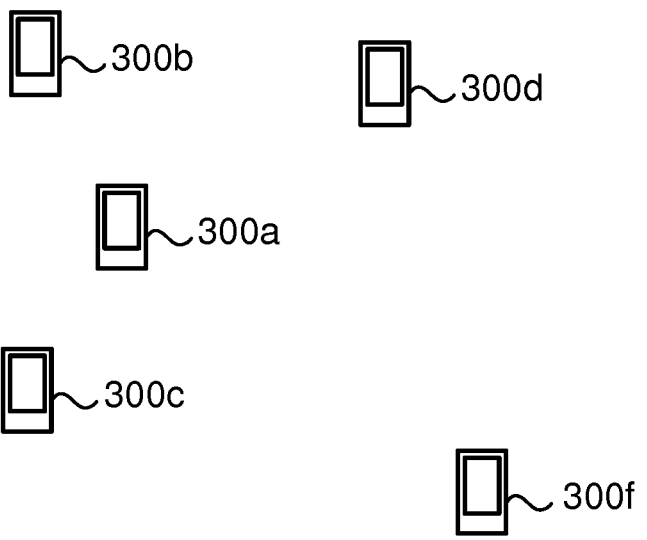
Figure 4:
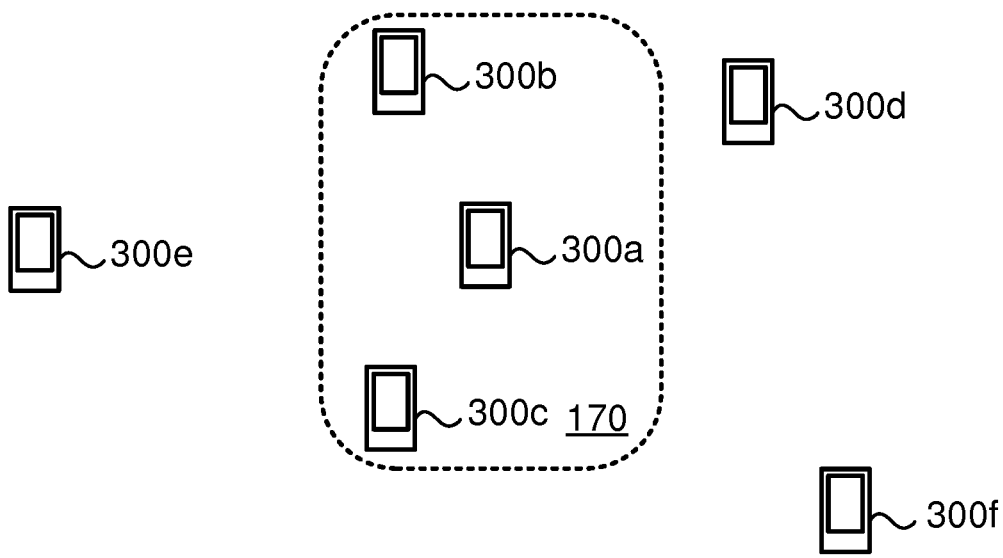
Figure 4:
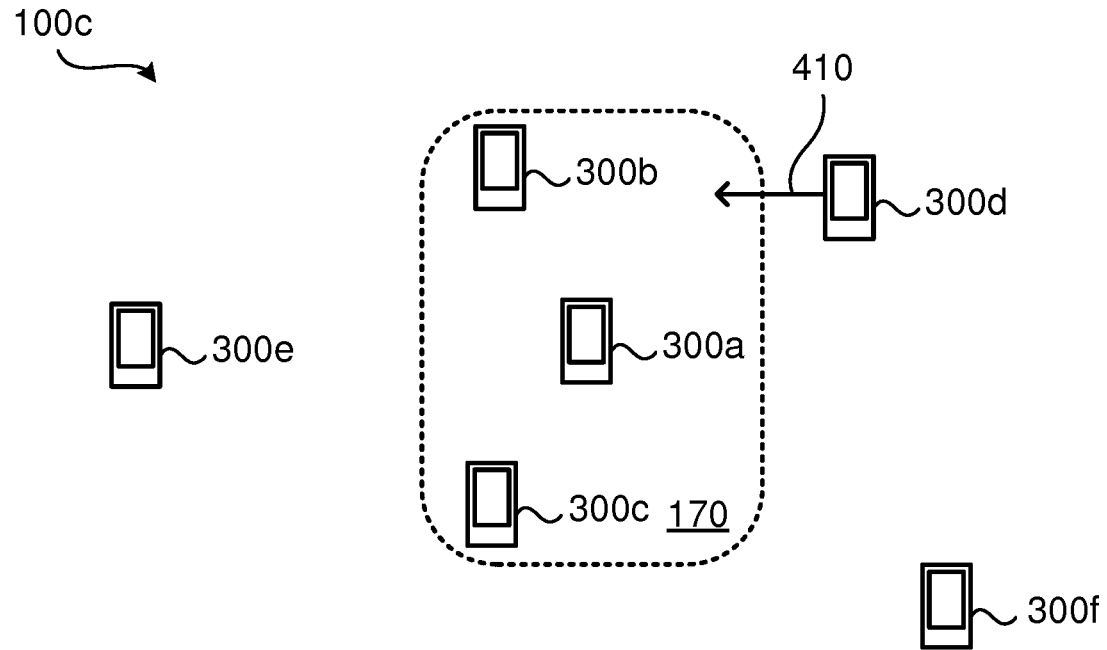
Figure 4:
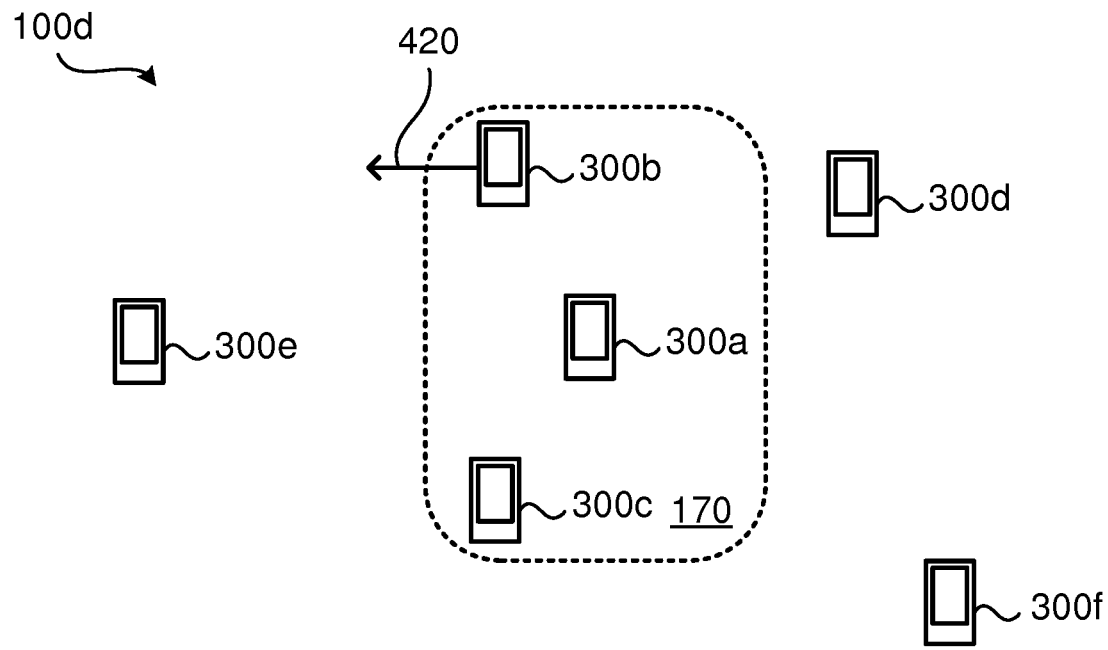

Reference is now made to FIG. 4 schematically illustrating different aspects of configuring a group of wireless devices 300a, 300b, 300c.

At FIG. 4(a) is schematically illustrated a communication network 100a comprising wireless devices 300a, 300b, 300c, 300d, 300e, 300f. It is assumed that wireless devices 300a, 300b, 300c are candidates for being grouped together.

At FIG. 4(b) is schematically illustrated a communication network 100b, where the wireless devices 300a, 300b, 300c of FIG. 4(a) have been grouped together to form a group of wireless devices 300a, 300b, 300c and thus define a mesh network 170.

At FIG. 4(c) is schematically illustrated a communication network 100c, where another wireless device 300d is joining 410 the group of wireless devices 300a, 300b, 300c formed in FIG. 4(b).

At FIG. 4(d) is schematically illustrated a communication network 100d, where one wireless device 300d is leaving 420 the group of wireless devices 300a, 300b, 300c formed in FIG. 4(b).

Figure 5:
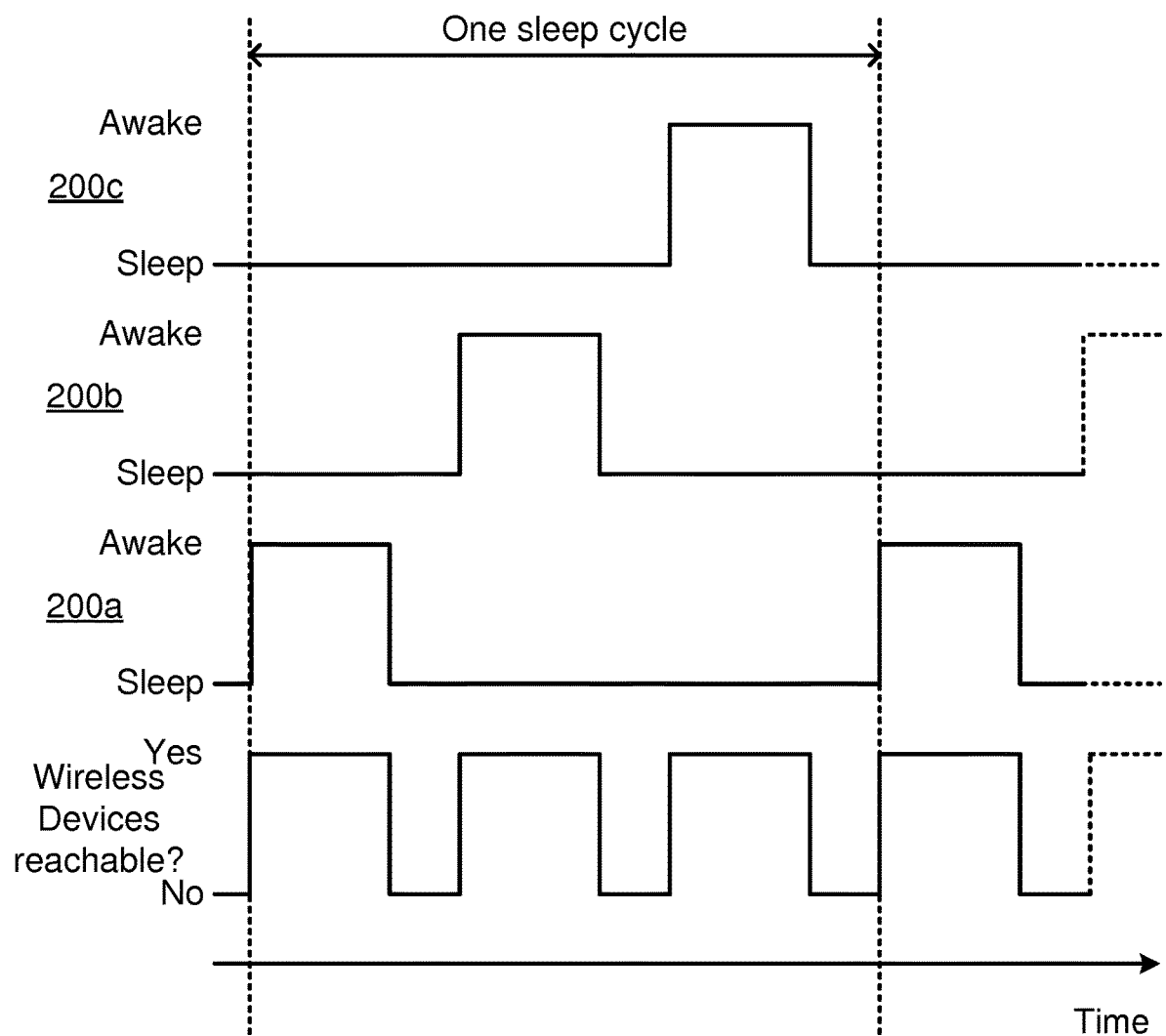
FIG. 5 is a schematic illustration of a sleep cycle according to an embodiment.

FIG. 5 schematically illustrates one sleep cycle for a group of wireless devices 300a, 300b, 300c according to an embodiment. The sleep cycle thus defines the reachability cycle of the wireless devices 300a, 300b, 300c such that the wireless devices 300a, 300b, 300c are reachable when being awake (i.e., when not in sleep mode) and not reachable when sleeping (i.e., when in sleep mode). The predefined occasions have been distributed within the group of wireless devices 300a, 300b, 300c. According to the illustrative example of FIG. 5, the predefined occasions have been distributed such that there is one respective occasion within the sleep cycle that each respective wireless device 300a, 300b, 300c wakes up.

In the illustrative example of FIG. 5 the awake and sleep times for the wireless device 300a, 300b, 300c are time shifted in relation to each other such that the occasions where one of the wireless device 300a, 300b, 300c is reachable is evenly distributed per sleep cycle. Other ways to distribute the predefined occasions have been disclosed above and thus the predefined occasions might be of uneven length and one of the wireless device 300a, 300b, 300c might have more predefined occasions within the sleep cycle than another one of the wireless device 300a, 300b, 300c. Further, in the illustrative example of FIG. 5 each wireless device 300a, 300b, 300c stays awake 4/18 time units, or approximately 22%, per sleep cycle. However, the proportion of the wake time has been exaggerated for illustrative purposes and in a real-world implementation the wake time would be considerably shorter.

Figure 6:
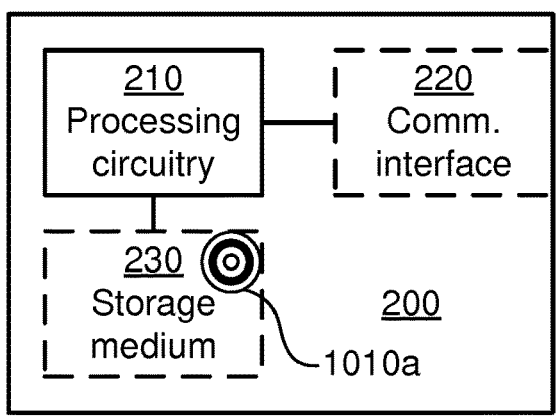
FIG. 6 is a schematic diagram showing functional units of a network node according to an embodiment.

FIG. 6 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, nodes, functions, and devices. As such the communications interface 220 may comprise one or more transmitters and receivers, comprising analogue and digital components. The communications interface 220 may be configured for communication with the wireless devices 300a, 300b, 300c, via the radio access network node 140, over the long-range wireless connection 150a, 150b, 150c and with other entities, nodes, functions, and devices, such as the network controller 180, in the core network 120 and/or service network 130 via another connection.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 7:
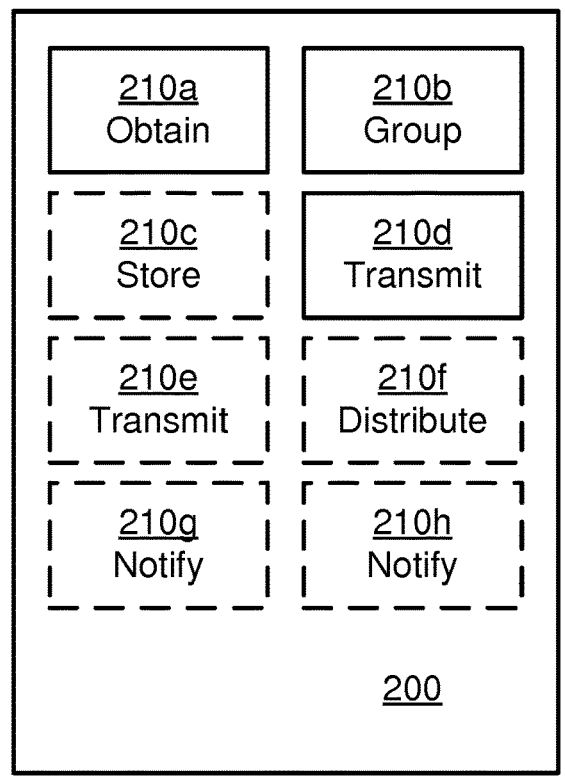
FIG. 7 is a schematic diagram showing functional modules of a network node according to an embodiment.

FIG. 7 schematically illustrates, in terms of a number of functional modules, the components of a network node 200 according to an embodiment. The network node 200 of FIG. 7 comprises a number of functional modules; an obtain module 210a configured to perform step S102, a group module 210b configured to perform step S104, and a transmit module 21od configured to perform step S108. The network node 200 of FIG. 7 may further comprise a number of optional functional modules, such as any of a store module 210C configured to perform step S106, a transmit module 210e configured to perform step S110, a distribute module 210f configured to perform step S112, a notify module 210g configured to perform step S114, a notify module 210h configured to perform step S116.

In general terms, each functional module 210a-210h may be implemented in hardware or in software. Preferably, one or more or all functional modules 210a-210h may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210h and to execute these instructions, thereby performing any steps of the network node 200 as disclosed herein.

Examples of network nodes 200 have been disclosed above. Further, the network node 200 may be provided as a standalone device or as a part of at least one further device. For example, the network node 200 may be provided in a node of the radio access network 110 or in a node of the core network 120. Alternatively, functionality of the network node 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 6 the processing circuitry 210 may be distributed among a plurality of devices, or nodes. The same applies to the functional modules 210a-210h of FIG. 7 and the computer program 1020a of FIG. 10.

Figure 8:
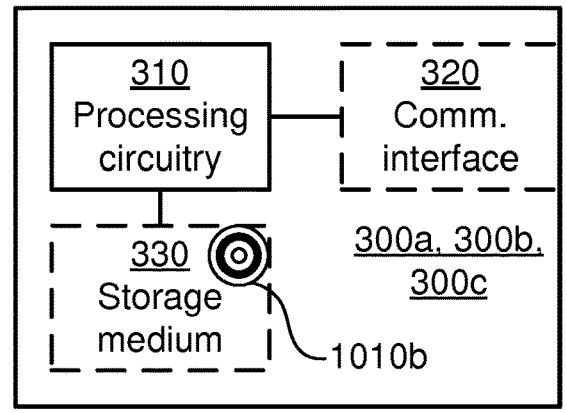
FIG. 8 is a schematic diagram showing functional units of a wireless device according to an embodiment.

FIG. 8 schematically illustrates, in terms of a number of functional units, the components of a wireless device 300a according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010b (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the wireless device 300a to perform a set of operations, or steps, as disclosed above. For example, the storage medium 330 may store the set of operations, and the processing circuitry 310 may be configured to retrieve the set of operations from the storage medium 330 to cause the wireless device 300a to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 300a may further comprise a communications interface 320 for communications with other entities, nodes, functions, and devices. As such the communications interface 320 may comprise one or more transmitters and receivers, comprising analogue and digital components. The communications interface 320 may be configured for communication with the network node 300 over the long-range wireless connection 150a, 150b, 150c and with other wireless devices 300b, 300c over the short-range connection 160a, 160b, 160c.

The processing circuitry 310 controls the general operation of the wireless device 300a e.g. by sending data and control signals to the communications interface 320 and the storage medium 330, by receiving data and reports from the communications interface 320, and by retrieving data and instructions from the storage medium 330. Other components, as well as the related functionality, of the wireless device 300a are omitted in order not to obscure the concepts presented herein.

Figure 9:
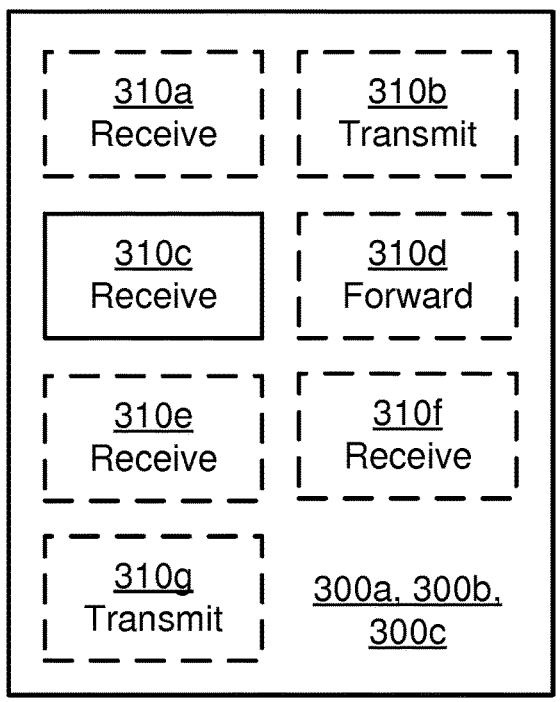
FIG. 9 is a schematic diagram showing functional modules of a wireless device according to an embodiment.

FIG. 9 schematically illustrates, in terms of a number of functional modules, the components of a wireless device 300a according to an embodiment. The wireless device 300a of FIG. 9 comprises a receive module 310c configured to perform step S206. The wireless device 300a of FIG. 9 may further comprise a number of optional functional modules, such as any of a receive module 310a configured to perform step S202, a transmit module 310b configured to perform step S204, a forward module 310d configured to perform step S208, a receive module 310e configured to perform step S210, a receive module 310f configured to perform step S212, a transmit module 310g configured to perform step S214.

In general terms, each functional module 310a-310g may be implemented in hardware or in software. Preferably, one or more or all functional modules 310a-310g may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310g and to execute these instructions, thereby performing any steps of the wireless device 300a as disclosed herein.

Examples of wireless devices 300a have been disclosed above. For example, as noted above the wireless device 300a might host the functionality of an IoT device.

Figure 10:
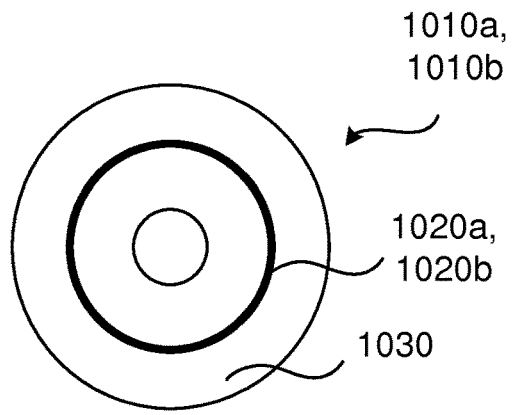
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the network node 200 as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the wireless device 300a as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuring a group of wireless devices capable of communicating with each other over a short-range connection and configured to communicate with a network node over a long-range wireless connection at respective predefined occasions, the method being performed by the network node, the method comprising:
obtaining information that the wireless devices are candidates for being grouped together;
grouping the wireless devices into the group of wireless devices by distributing the predefined occasions within the group of wireless devices such that all the predefined occasions, for all the wireless devices in the group of wireless devices, do not fully overlap in time, wherein the predefined occasions are associated with a reachability cycle of each wireless device;
transmitting information indicative of the distributed predefined occasions to the wireless devices in the group of wireless devices, thereby configuring the group of wireless devices;
re-distributing the predefined occasions within the group of wireless devices upon one wireless device in the group of wireless devices being confirmed to leave the group of wireless devices; and
notifying said one wireless device leaving the group of wireless devices to, before leaving the group of wireless devices, provide information indicative of the re-distributed predefined occasions to the wireless devices in the group of wireless devices.

2. The method according to claim 1, wherein the information indicative of the configured predefined occasions is transmitted to a single one of the wireless devices in the group of wireless devices over the long-range wireless connection and in one of the predefined occasions for that single one of the wireless devices.

3. The method according to claim 1, wherein the information that the wireless devices are candidates for being grouped together is obtained from at least one of the wireless devices in the group of wireless devices.

4. The method according to claim 1, wherein which of the wireless devices to be grouped into the group of wireless devices is based on geographical location for each individual wireless device.

5. The method according to claim 1, further comprising:
re-distributing the predefined occasions within the group of wireless devices upon another wireless device being confirmed to join the group of wireless devices.

6. The method according to claim 5, further comprising:
notifying said another wireless device to, upon joining the group of wireless devices, provide information indicative of the re-distributed predefined occasions to the wireless devices in the group of wireless devices.

7. The method according to claim 5, wherein which another wireless device is allowed to join the group of wireless devices, and/or which wireless device in the group of wireless devices is allowed to leave the group of wireless devices is controlled by the network node.

8. The method according to claim 1, wherein the reachability cycles of the wireless devices are based on characteristics of the wireless devices pertain to at least one of remaining battery power and total battery capacity.

9. The method according to claim 1, wherein the predefined occasions are associated with the reachability cycle of each wireless device by specifying how often each wireless device is to exit a sleep mode for being reachable and for how long each wireless device is to stay awake during each reachable occasion.

10. A method for a wireless device to be grouped into a group of wireless devices capable of communicating with each other over a short-range connection and configured to communicate with a network node over a long-range wireless connection at respective predefined occasions, the method being performed by one wireless device in the group of wireless devices to be formed, the method comprising:
receiving information, the information originating from the network node and being indicative of the predefined occasions as distributed within the group of wireless devices, wherein the predefined occasions are distributed such that all the predefined occasions, for all the wireless devices in the group of wireless devices, do not fully overlap in time, wherein the predefined occasions are associated with a reachability cycle of each wireless device, wherein the information indicates that the wireless device is part of the group of wireless devices;

receiving, when confirmed to leave the group of wireless devices, information indicative of the distributed predefined occasions having been re-distributed within the group of wireless devices; and transmitting information indicative of the re-distributed predefined occasions to the wireless devices in the group of wireless devices before leaving the group of wireless devices.

11. The method according to claim 10, further comprising:

transmitting, before being part of the group of wireless devices, information that the wireless devices are candidates for being grouped together towards the network node.

12. The method according to claim 10, further comprising:

receiving, when being part of the group of wireless devices, information of re-distribution of the predefined occasions within the group of wireless devices upon another wireless device joining the group of wireless devices, and/or upon one wireless device in the group of wireless devices leaving the group of wireless devices.

13. The method according to claim 12, wherein the information of re-distribution is received from said another wireless device upon said another wireless device joining the group of wireless devices, and/or is received from said one wireless device upon said one wireless device leaving the group of wireless devices.

14. The method according to claim 10, wherein the predefined occasions are defined by a power save mode, PSM, configuration collectively determined for the group of wireless devices by the network node.

15. The method according to claim 10, wherein the predefined occasions are defined by a discontinuous reception, DRX, cycle configuration collectively determined for the group of wireless devices by the network node.

16. The method according to claim 10, wherein the predefined occasions are associated with the reachability cycle of each wireless device by specifying how often each wireless device is to exit a sleep mode for being reachable and for how long each wireless device is to stay awake during each reachable occasion.

17. A network node for configuring a group of wireless devices capable of communicating with each other over a short-range connection and configured to communicate with a network node over a long-range wireless connection at respective predefined occasions, the network node comprising processing circuitry, the processing circuitry being configured to cause the network node to perform operations comprising:

obtaining information that the wireless devices are candidates for being grouped together;

grouping the wireless devices into the group of wireless devices by distributing the predefined occasions within the group of wireless devices such that all the predefined occasions, for all the wireless devices in the group of wireless devices, do not fully overlap in time, wherein the predefined occasions are associated with a reachability cycle of each wireless device;

transmitting information indicative of the distributed predefined occasions to the wireless devices in the group of wireless devices, thereby configuring the group of wireless devices;

re-distributing the predefined occasions within the group of wireless devices upon one wireless device in the group of wireless devices being confirmed to leave the group of wireless devices; and notifying said one wireless device leaving the group of wireless devices to, before leaving the group of wireless devices, provide information indicative of the re-distributed predefined occasions to the wireless devices in the group of wireless devices.

18. The network node according to claim 17, wherein the predefined occasions are associated with the reachability cycle of each wireless device by specifying how often each wireless device is to exit a sleep mode for being reachable and for how long each wireless device is to stay awake during each reachable occasion.

19. A wireless device for being grouped into a group of wireless devices capable of communicating with each other over a short-range connection and configured to communicate with a network node over a long-range wireless connection at respective predefined occasions, the wireless device comprising processing circuitry, the processing circuitry being configured to cause the wireless device to perform operations comprising:

receiving information, the information originating from the network node and being indicative of the predefined occasions as distributed within the group of wireless devices, wherein the predefined occasions are distributed such that all the predefined occasions, for all the wireless devices in the group of wireless devices, do not fully overlap in time, wherein the predefined occasions are associated with a reachability cycle of each wireless device, wherein the information indicates that the wireless device is part of the group of wireless devices;

receiving, when confirmed to leave the group of wireless devices, information indicative of the distributed predefined occasions having been re-distributed within the group of wireless devices; and transmitting information indicative of the re-distributed predefined occasions to the wireless devices in the group of wireless devices before leaving the group of wireless devices.

20. The wireless device according to claim 19, wherein the predefined occasions are associated with the reachability cycle of each wireless device by specifying how often each wireless device is to exit a sleep mode for being reachable and for how long each wireless device is to stay awake during each reachable occasion.

21. A non-transitory computer readable medium comprising computer program instructions for configuring a group of wireless devices capable of communicating with each other over a short-range connection and configured to communicate with a network node over a long-range wireless connection, the computer program instructions comprising computer code which, when run on processing circuitry of a network node, causes the network node to perform operations according to claim 1.

22. A non-transitory computer readable medium comprising computer program instructions for a wireless device to be grouped into a group of wireless devices capable of communicating with each other over a short-range connection and configured to communicate with a network node over a long-range wireless connection at respective predefined occasions, the computer program instructions comprising computer code which, when run on processing circuitry of the wireless device, causes the wireless device to perform operations according to claim 10.

* * * * *